(No Model.)
C. H. ALLEN.
CLIP FOR ROPE TRACES.
No. 368,867. Patented Aug. 23, 1887.
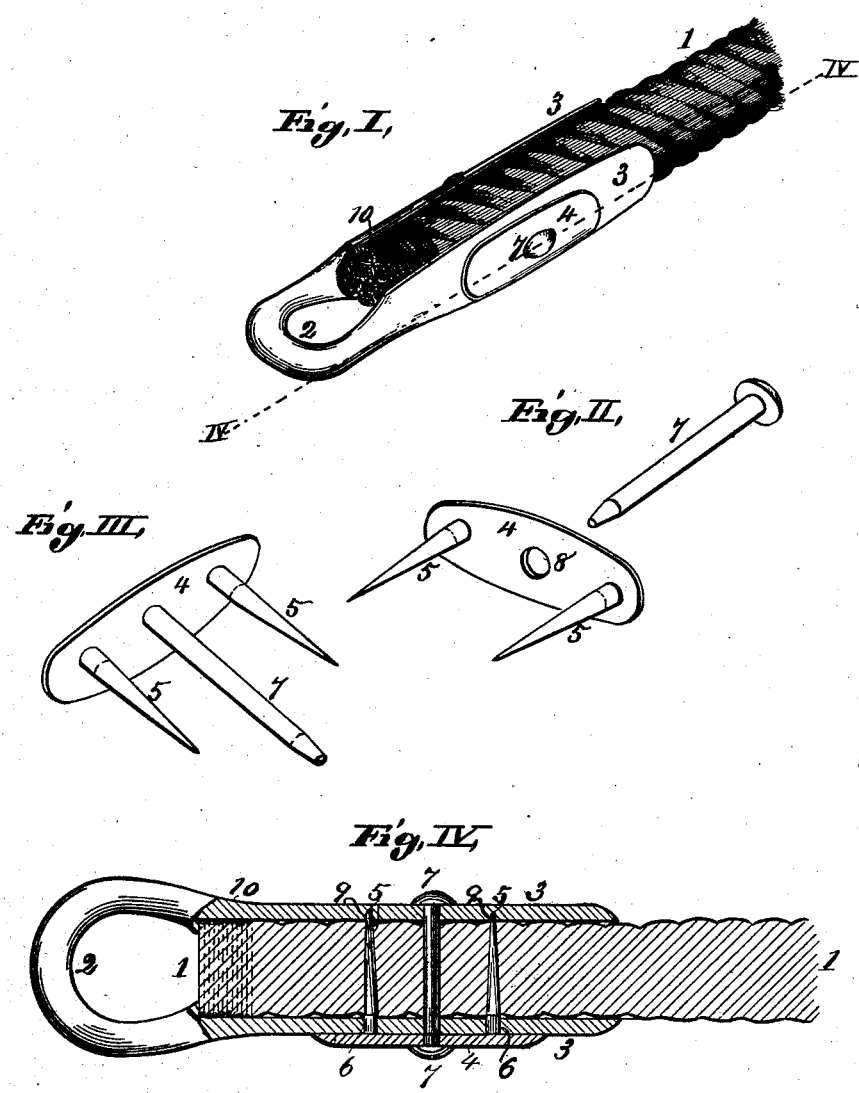
Attest:
F. A. Hopkins
Emma Arthur
Inventor:
Cotton H. Allen.
By Knight Bro's
attys.

UNITED STATES PATENT OFFICE.

COTTON H. ALLEN, OF ST. LOUIS, MISSOURI.

CLIP FOR ROPE TRACES.

SPECIFICATION forming part of Letters Patent No. 368,867, dated August 23, 1887.

Application filed March 25, 1887. Serial No. 232,450. (No model.)

*To all whom it may concern:*

Be it known that I, COTTON H. ALLEN, of the city of St. Louis, in the State of Missouri, have invented a certain new and useful Improvement in Clips for Rope Traces, of which the following is a full, clear, and exact description, reference being had to the accompanying drawings, forming part of this specification.

The improvement consists in the following combination, viz: a metal clip having curved tongues fitting the outside of the rope, a plate curved to fit the outside of one of the tongues, and having upon it tapering prongs or teeth which pass through holes in the tongue and through the rope, and into recesses or holes in the other tongue, and a rivet which passes through both tongues and through the rope, and which is riveted fast to hold the tongues hard to the rope.

Figure I is a perspective view of the device. Fig. II is a perspective view of the plate and the rivet or pin, the latter being removed from the plate. Fig. III is a perspective view of the plate with the pin secured to the plate. Fig. IV is a longitudinal section at IV IV, Fig. I, showing the position of parts.

The part of the rope to which the clip is attached is shown at 1. The clip has an eye, 2, which is fitted to engage a hook or an eye on the hame.

3 are tongues, which are curved to fit the outside of the rope.

4 is a plate, which fits neatly against the outside of one of the tongues, and which has upon it prongs or teeth 5, that pass through holes 6 in the tongue and extend through the body of the rope, and into recesses or holes 9 in the other tongue. They are made tapering, so as to enter the rope easily, and to wedge tight therein.

7 is a rivet or pin, which may be inserted in a hole, 8, of the plate 4, or may be made in one piece with the plate. This rivet or pin passes through both the tongues and the rope, and its end is riveted against the tongue, as seen in Fig. IV.

It will be seen that the device consists of only two or three parts, according to whether the pin or rivet 7 is made fast to the plate 4 or is made of a separate piece.

The device may very properly be made of malleable iron.

I have shown a single rivet 7. There may be more than one, if desired. I have also shown two of the prongs or teeth 5. There may be only one, or any larger number. It will be seen that the bearing of the ends of the prongs or teeth 5 in the recesses 9 gives them great power of resistance to strain tending to draw the rope from the clip, and that they can be drawn out without difficulty to allow a new rope to be substituted for the old one.

I am aware that rope-clips have before been made with spurs or projections on the inside of the tongues to give a firmer hold upon the rope; but there is great objection to these devices, owing to the difficulty of insertion and removal of the rope.

The end of the rope is wound with wire 10, to prevent its untwisting.

I claim as my invention—

The trace 1 and clip 2, having arms 3, perforated and recessed, as shown and described, in combination with the plate 4, having tapering prongs 6, adapted to be passed through the perforations in one of the arms and enter the recesses in the other arm, and the connecting-rivet 7, as specified.

COTTON H. ALLEN.

In presence of—
GEO. T. SWORMSTEDT,
EDW. S. KNIGHT.